United States Patent [19]
Harris et al.

[11] Patent Number: 5,954,132
[45] Date of Patent: Sep. 21, 1999

[54] PATCHING OF INJECTION AND PRODUCTION WELL ANNULAR CASING LEAKS FOR RESTORING MECHANICAL INTEGRITY

[76] Inventors: Todd K. Harris; Kenneth E. Harris, both of 1015 Whittle St., Olney, Ill. 62450

[21] Appl. No.: 08/743,242

[22] Filed: Nov. 5, 1996

[51] Int. Cl.⁶ ..................................................... E21B 33/13
[52] U.S. Cl. ........................... 166/293; 166/295; 166/277
[58] Field of Search .................................... 166/285, 292, 166/293, 294, 295, 277

[56] References Cited

U.S. PATENT DOCUMENTS

| | | | |
|---|---|---|---|
| 4,462,836 | 7/1984 | Baker et al. | 106/92 |
| 4,706,755 | 11/1987 | Roark et al. | 166/295 |
| 4,784,693 | 11/1988 | Kirkland et al. | 166/293 X |
| 5,016,711 | 5/1991 | Cowan | 166/293 |
| 5,020,598 | 6/1991 | Cowan et al. | 166/293 |
| 5,275,654 | 1/1994 | Cowan | 106/661 |

Primary Examiner—William P. Neuder
Attorney, Agent, or Firm—Baker & Daniels

[57] ABSTRACT

A system designed to patch single and multiple casing leaks that occur in an injection well annulus where there is direct communication from the outermost casing string to the original open-hole wellbore and the adjacent earth strata. This system utilizes a four-stage process which consists of four separate types of fluids. The first injection stage is a $CaCl_2$ solution in water. The second injection stage utilizes $H_2SiO_3$, $Na_2$ in a solution of water to create sodium metasilicate $Na_2SiO_3$ in water. These two react in a double replacement chemical reaction to yield an aqueous phase and a solid phase. The third injection stage is then implemented, the same including a bentonite/attapulgite/diatomaceous earth slurry with large plugging materials suspended therein. The fourth stage utilizes covalently bonded $N_2$ in a gaseous state. After injection of the first three stages $N_2$ pressure is applied and the staged patching material migrates to the casing hole(s), thread leak, packer leak, or perforation. Upon restriction, the materials then combine and a filtration process beings. Filtration continues until the contents of the third stage have completed their plating action and a tight impermeable seal is in place at the problem area.

10 Claims, 1 Drawing Sheet

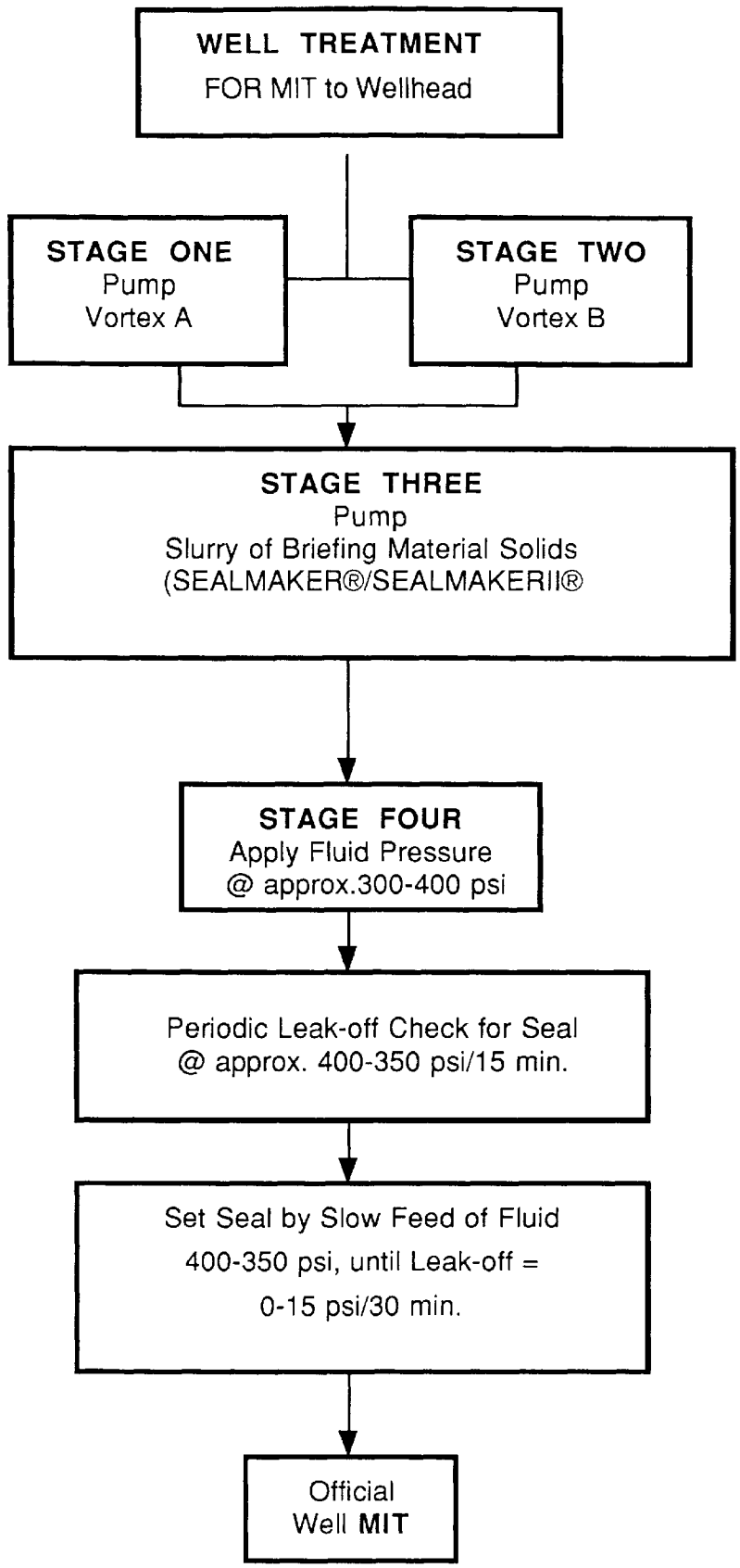

PATCHING OF INJECTION AND PRODUCTION WELL ANNULAR CASING LEAKS FOR RESTORING MECHANICAL INTEGRITY

BACKGROUND OF THE INVENTION

1. Field of the Invention

The invention relates to a wellbore treatment process wherein the wellbore is utilized for injection or disposal of a fluid into a subterranean formation.

2. Description of Related Current Art

Injection and disposal wells are utilized throughout the world to reinject produced waters from hydrocarbon recovery to systematically enhance recovery of those hydrocarbons by volumetric production of re-injected waters as well as to maintain pressure on those producible zones. Disposal wells are utilized to dispose of liquid wastes into an underground containment reservoir. An injection well is typically constructed as follows:

A surface string is usually run from the surface through all fresh water reservoirs for protection. Many older wells do not have protective pipe all the way through known fresh water zones. Inside of the surface string is a production string of pipe which is typically 7", 5½", or 4½" diameter steel casing pipe. This production string is run from the surface to the production zone. The casing is cemented in place. This casing is then perforated to allow fluid injection/disposal into that formation. An injection string of tubing typically 2½" is then run into the well inside of the production casing. A packer is connected to this tubing and is used to isolate or "pack-off" the injection interval. Pressure from injection will remain below this packer and on the inside of the tubing string. The annulus therefore will have no pressure during normal injection/disposal operations. A wellhead connection is utilized at the surface to hang the tubing and hold tension on the injection packer below. The wellhead typically has two (2) two-inch female pipe connections for access to the annulus each located 180° to one another. The top of the wellhead is designed to accept the tubing and contains slips to hang the tubing from. A flat plate lays on top of the slips and inside of the wellhead. A rubber packing ring is then placed on top of this plate with another ring laid on top of the rubber for compressing the rubber. A special lid fits over this assembly and when tightened, compresses the rubber between the two rings on top of the slips. When the rubber is compressed the wellhead is then packed off and no pressure can escape this connection. Water is then injected from the surface through the tubing and isolated below the packer leaving an annular space between the tubing and the production casing above the packer which can be accessed through the wellhead connections.

State regulations address required Mechanical Integrity Testing (MIT) of this annular space in their Underground Injection regulations intended for fresh water zone protection. For example, the State of Texas requires in Section 3.9 Rule 9. DISPOSAL WELLS (Amended Effective Apr. 1, 1982) Paragraph (11) TESTING.

(A) Before beginning disposal operations, the operator shall pressure-test the long string casing. The test pressure must equal the maximum authorized injection pressure or 500 psig, whichever is less, but must be at least 200 psig.

(B) Each disposal well shall be pressure-tested in the manner provided in subparagraph (A) of this paragraph at least once every 5 years to determine if there are leaks in the casing, tubing, or packer. The Director may prescribe a schedule and mail notification to operators to allow for orderly and timely compliance with this requirement.

According to the Railroad Commission of Texas that once the starting test pressure is stable, a 10% variation from initial pressure is allowed throughout a 30-minute test interval in order to pass the Mechanical Integrity Test (MIT).

Under the State of Illinois requirements outlined in 62 ILLINOIS ADMINISTRATIVE CODE Section 240.780 Reporting Requirements for Class II UIC Wells subpart g) Pressure Test:

The following pressure test shall be performed on Class II UIC Wells to establish the internal mechanical integrity of the tubing, casing and packer of the well. The permittee shall contact the District Office in which the well is located at least twenty-four (24) hours prior to conducting a pressure test to enable an inspector to be present when the test is done . . .

1) Pressure Test:

The casing-tubing annulus above the packer shall be tested under the supervision of the Department at a minimum pressure differential between the tubing and the annulus of 50 PSIG for a period of 30 minutes. In addition, the casing-tubing annulus starting pressure shall not be less than 300 PSIG and may vary no more than five (5) percent of the starting test pressure during the test. The well may be operating or shut in during the test.

There is large proportion of underground injection/disposal wells that will not pass the required state tests due to casing holes, thread leaks, packer leaks, etc. Some commonly used oil field applications include cement sqeezing, crosslinking polymers by applying a solute chrome or boron ion into a solvent of polymer consisting of guar, xanthan gum, HEC, CMC, PHPA, polyacrylamides, etc. Other methods include simple injection of gellable polymer solutions, calcium carbonate in graduated sizes, and even in some cases, basic food-grade corn meal which enlarges as it absorbs water. Polyethylene liners, steel casing liners, etc., are other alternative methods, however, they reduce original hole size which is most cases is undesirable.

A practical economical method is needed to patch casing leaks on injection wells that requires no work-over rig, that sacrifices no hole diameter, that inhibits corrosion, that will not jeopardize packer retrieval, and most importantly, quickly and effectively, restores mechanical integrity to those existing wells to allow them to pass MIT.

| DESCRIPTION OF RELATED PATENT ART | | | |
|---|---|---|---|
| INVENTOR | DATE | U.S. PAT. NO. | DESCRIPTION |
| Burdge et al. | 1988 | 4,730,674 | Plugging a Tubing/Casing Annulus |
| Bennett et al. | 1988 | 4,754,810 | Method for Patching Casing Leaks |
| Himes et al. | 1993 | 5,191,931 | Fluid Loss Control Method |
| Johnson et al. | 1993 | 5,228,524 | Fluid System for Controlling Fluid Losses |
| Cowan | 1996 | 5,484,020 | Remedial Wellbore Sealing |

SUMMARY OF THE INVENTION

The present invention provides a system for patching casing leaks of any type, more particularly designed for an injection well annulus. These leaks, due to regulation and subsequent MIT failure, can interrupt hydrocarbon recovery which translates into lost revenues for the operator. Due to expensive alternative methods, economics may require these wells to be plugged prematurely. Internal tubing failure could also occur due to the corrosive nature of fluids which can freely enter the annular wellbore through these existing holes whereby it can react with the injection tubing. This can lead to separation of the tubing and packer which could also require the well to be plugged if not retrievable.

The objectives of the present invention are achieved by staging four (4) separate and distinctly different fluids in a predetermined volume and order via a unique pumping technique. Each stage remains independent of the other, until restriction is encountered at the point of a casing leak.

Upon restriction, the first two stages combine, thereby creating a double replacement chemical reaction. Two (2) aqueous phase chemicals react therein to yield a single aqueous phase and a distinctly different solid phase, the latter being characterized as possessing an extremely high filtration rate when pressed.

A third stage follows which performs several functions:
It utilizes a high concentration of flake, fiber, and granular bridging materials for large and multiple holes. It likewise provides additional high filtration materials to fill large, void spaces and it provides independent filtrate reducers to achieve permanent plate-off and a completed seal. Moreover, it provides for corrosion control.

The fourth and final stage exerts the pressing forces required in the invention. A controlled filtration process continues through multiple filtration mediums, each possessing unique characteristics in this regard. As the filtration process progresses, the seal becomes increasingly competent. Field testing has proven that a seal can be achieved as early as stage one in the process, with no further stages required. This is not typical, but possible.

This overall process provides a distinct advantage over commonly utilized leak control methods which are known in the art. For example, no work-over rig is required for this method of restoring mechanical integrity. Injection does not have to be interrupted for this performance herein. Annular residual of the treatment will remain fluid, thereby acting as a high quality packer fluid. This fluid remains as a protective barrier should a tubing leak develop and subsequent inadvertent pressuring of the annulus result.

As indicated above, the 300 PSI application is a four-stage process which utilizes four separate types of fluids. The first two combine in a double-replacement chemical reaction to yield a soft, permeable glassy substance which in effect begins to create a bridge across the casing surface. This material is permeable so water can still be forced through the crystalline structure. A fresh water based bentonite slurry with high concentrations of lost circulation materials is then used in the third stage to complete the bridge, however an impermeable seal is still not completely intact. With the well shut in, nitrogen gas is then pushed behind the first three stages. This nitrogen gas forces the water to be pressed out of the bridging material which creates the impermeable seal and in fact places a patch on the casing precluding further gas penetration through it. The well at this point is pressured to the 300 PSI requirement and the state inspector is called to the well for testing and approval.

DESCRIPTION OF THE DRAWINGS

The flow chart depicts the four-stage method in its preferred sequence.

DETAILED DESCRIPTION OF THE PREFERRED EMBODIMENTS

The invention begins with the need to pump solution into an annulus that may or may not contain fluid, and, that may or may not build pressure upon injecting fluid into the annulus. One primary constraint, especially in older wells that have casing problems is further degradation of that casing when hydraulic force is applied during the pumping stage of the treatment cycle. Optimum pumping technique herein, requires the use of a centrifugal pump capable of exerting loads of up to but not exceeding 310 psig. Optimal treatment pressure is 300 psig. To practice this invention one utilizes an Ingersoll-Rand HOC2 1½"×3"×13" centrifugal pump or equivalent, capable of pumping to 310 psig. In effect, the possibility of hydraulic overload, and subsequent pipe failure, due to exceeding the mechanical limitations of the casing, is reduced due to the mechanics of the centrifugal. A second advantage in utilizing this type of centrifugal pump lies in its ability to pump large solid sizes, for example, the HOC2 can pump solids up to ½" diameter. This pump system insures ones ability to pump into an annulus, according to the invention, with a "set" packer, with a high margin of safety not to exceed mechanical limitations of the existing casing. The method is initiated by rig up of the pumper. See the chart.

Stage 1: VORTEX A $CaCl_2$ $CaCl_2$ is added to a solution of fresh water. Field test results have concluded that a density of 70.31 Lb/Cu Ft is optimal. Density can be varied, however, increases in density can result in a break-over due to saturation of the second stage thereby providing an excess of $CaCl_2$ which unreacted, produces only excess $H_2O$ in the process. Stage 1 is thus termed VORTEX A.

Stage 2: VORTEX B $Na_2SiO_3$ $Na_2SiO_3$ is added to a solution of fresh water. Field tests have concluded that a density of 75.55 Lb/Cu Ft is optimal with a $CaCl_2$ solution of 70.31 Lb/Cu Ft. Stage 2 is thus termed VORTEX B.

Stage 3: SEALMAKER®/SEALMAKER II®

Bentonite/Attapulgite/Diatomaceous earth slurry formulated as follows: SEALMAKER II® in fresh water:

24.5 Lb/Bbl Bentonite: API 200 Mesh Montmorillonite

NaOH added to raise pH to 11.5

Sulfide Scavenging Biocide as required for application typically at 1% solution corrosion inhibitor with filmingamines and oxygen scavengers @ 1% solution 25–30 Lb/Bbl Lost Circulation Materials consisting of:

5.0 Lb/Bbl Multi-Seal or equivalent (available from Cedar Fiber, Inc.)

5.0 Lb/Bbl Cottonseed Hulls 5.0 Lb/Bbl Cedar Fiber 5.0 Lb/Bbl Cellophane ⅜" cut 5.0 Lb/Bbl Pecan Shells-medium 5.0 Lb/Bbl Mica-fine 1 Lb/Bbl Calcium carbonate 0.1 Lb/Bbl $Ca(OH)_2$ The above concentrations may be varied as needed for individual applications for specific matching of LCM sizes required.

Stage 3: SEALMAKER® SEALMAKER® may be substituted for SEALMAKER II® or in some cases is required as an adiditional stage, depending upon well conditions. Typically it is run as a first stage or behind the second stage.

SEALMAKER® is formulated as follows in fresh water:

1–2 Lb/Bbl Ca(OH)$_2$ for pH to 11–12

15 LB/Bbl Attapulgite

35 Lb/Bbl Diatomaceous earth

1%1/Bbl Corrosion inhibitor with filmingamines and oxygen scavengers

1%/Bbl Biocide 5.0 Lb/Bbl Multi-Seal or equivalent (available from Cedar Fiber, Inc.)

5.0 Lb/Bbl Cottonseed Hulls 5.0 Lb/Bbl Cedar Fiber 5.0 Lb/Bbl Cellophane ⅜" cut 5.0 Lb/Bbl Pecan Shells-medium 5.0 Lb/Bbl Mica-fine The above cocentrations can be varied as needed for individual applications with specific matching of LCM sizes.

Stage 4: N$_2$

Nitrogen gas

To effect the sealing properties of the above formulations the following occurs:

Vortex A is injected into the annulus immediately followed by Vortex B. SEALMAKER® or SEALMAKER II® is then injected behind the first two stages. SEALMAKER II®, stage 3, follows Vortex A and Vortex B down the annulus toward the hole. Pumping of SEALMAKER® or SEALMAKER II® continues until 300 psig or the predetermined volume is reached. Required volume depends upon depth, size and permeability of the hole in the casing. As fluids begin to enter the casing hole(s) and upon restriction, the fluids begin to mix together which creates the following chemical reaction between Vortex A and Vortex B: $CaCl_2 + Na_2SiO_3 = CaSiO_3 + 2NaCl$. The NaCl is in a solution of water which is not represented in the chemical equations and descriptions above. The $CaSiO_3$ is a glassy, crystalline solid which has the resulting NaCl liquid entrained throughout. As pressure builds, the pressing forces increase on these two products thereby beginning a filtration process on the $CaSiO_3$. An initial bridge begins to form at this point. Immediately behind this is the SEALMAKER® or SEALMAKER II® which provides for additional bridging and final plating. The pumping phase will continue until pressure increases to 300 psig at which point the HOC2 pump will stop moving fluid. Upon completion of the pumping phase, the well is then isolated for injection of N$_2$ compressed nitrogen gas. See the attached chart. The nitrogen is regulated for flow into the annulus. Nitrogen will continue the filtration until all water is pressed from the Vortex A/B leaving a tight compacted slightly permeable $CaSiO_3$ structure between the outer casing wall and the exposed openhole wellbore face. SEALMAKER II® now begins the final plating action by depositing various sizes of bridging materials on and around the $CaSiO_3$ bridging structure, thereby creating additional restriction. Bentonite/Attapulgite begins to fill the microvoids in the $CaSiO_3$ structure. This filtration/deposition phase progressively plates until the crystalline structure becomes impermeable. When filtration is complete, the material will have plated from the exposed open-hole wellbore inwards into the casing hole. The plating process ends when the casing hole is sealed and no further filtration can occur. The patch is then in place, flush with the inside casing wall. Residual SEALMAKER®/SEALMAKER II® that remains in the annulus acts as a packer fluid with elevated pH, corrosion inhibitors, and biocide for corrosion protection.

EXAMPLES

The following examples illustrate the flexibility of this invention to perform successfully throughout a wide range of problems.

CASE 1

Location: Wayne County, Ill.

Problem: Conversion of producing oil well to injection well. Maximum annular pressure is 140 psi with total leak-off to zero (0) psi in 2 minutes. Well is 3250' with hole estimated at 1800'.

Solution: Rig up invention apparatus on location. Pump 300 PSI-SEALMAKER II®. Pressure is bumped at 300 psi with 126 gal Vortex A, 126 gal Vortex B, 504 gal SEALMAKER II®. Well is put on to nitrogen feed and pressure is increased to 365 psi. Continuous nitrogen feed is completed @ 18 hrs. Pressure is increased to 410 psi and shut in for test with no leak-off occurring. Well is circulated out to demonstrate sealing effectiveness of the invention. Packer and tubing is pulled, additional injection zone is perforated and new tubing and packer run into hole. Hole is then repressured under State of Illinois supervision and pressure is increased to 328 psi. Well passed MIT with no leak-off during the 30 minute test interval.

CASE 2

Location: Crawford County, Ill.

Problem: Saltwater disposal well in violation with State of Illinois for failure to MIT. Currently disposing at least 2000 barrels/day. Well is 1300' with packer set at 950'. Well can be pressured to 70 psi at maximum injection rate with total leak-off in less than one minute.

Solution: Rig-up and pump 300 PSI-SEALMAKER II®. Pressure is increased to 200 psi with 168 gal Vortex A, 126 gal Vortex B, 210 gal SEALMAKER II ®. Well is then isolated for nitrogen feed. Pressure is increased to 400 psi @ 5 hours. Well is shut in overnight. Pressure bled to 280 psi @ 15 hours. Pressure is increased to 310 psi and passed MIT with zero (0) psi leak-off during test interval.

CASE 3

Location: Wabash County, Ill.

Problem: Injection well will not pass MIT. Well is required for continued production on lease. Annular pressure can be increased to 50 psi and with continued rate at 50 psi, fluid migration into the surface pipe occurred. Packer is set below 1300'.

Solution: Rig-up and pump 300 PSI-SEALMAKER II®. Install valve on surface pipe for monitoring and controlling pressure on surface pipe. Pump 210 gal Vortex A, 210 gal Vortex B, 1250 gal SEALMAKER II®. Pumping pressure increased to 175 psi. Isolate well for nitrogen feed. Pressure is increased to 220 psi. Surface pipe pressure is bled to zero @ 2 hours and annular pressure is increased to 375 psi. Well is shut in @ 375 psi with no pressure at the surface pipe. At 72 hours, well passed MIT at 350 psi with no leak-off.

CASE 4

Location: Lawrence County, Ill.

Problem: Four injection wells will not pass MIT and under violation by State of Illinois. Well 1 would pressure to 280 psi with 50 psi leak-off/30 minutes. Well 2 would pressure to 160 psi with 20 psi leak-off/30 minutes. Well 3 would pressure to 400 psi with communication to the surface inside of surface pipe. Leak-off was 280 psi/30 minutes. Well 4 would pressure to 300 psi with 25 psi leak-off/30 minutes.

Solution: Rig-up and pump 300 PSI-SEALMAKER II® on all four wells. Well 1: pumped 25 gal Vortex A, 25 gal Vortex B, 45 gal SEALMAKER II®. Well pressured to 300 psi, isolated to nitrogen and pressured to 350 psi. Well 1 passed MIT @ 18 hours. Well 2: pumped 42 gal Vortex A, 42 gal Vortex B, 84 gal SEALMAKER II®. Pressured to 300 psi, isolated to nitrogen, pressured to 365 psi and passed MIT @ 17 hours. Well 3: pumped 25 gal Vortex A, 25 gal Vortex B, 10 gal SEALMAKER II®. Well pressured to 300 psi and isolated to nitrogen. Pressured to 400 psi with no pressure back to the surface. Well passed MIT @ 16 hours. Well 4: pumped 20 gal Vortex A, 10 gal Vortex B, 10 gal SEALMAKER II®. Well pressured to 300 psi and was isolated to nitrogen. Pressured to 350 psi and well passed MIT @ 15 hours.

CASE 5

Location: Crawford County, Ill.

Problem: Injection well will not pass MIT due to perforations above injection packer.

Solution: Rig-up and pump 300 PSI-SEALMAKER II®. Pumped 126 gal Vortex A, 126 gal Vortex B, 126 gal SEALMAKER®. Well pressured to 100 psi and was isolated to nitrogen. Well pressured to 345 psi and passed MIT @ 24 hours.

CASE 6

Location: Gibson County, Ind.

Problem: Well was pulled to change injection interval. The packer was dropped when tubing was inadvertently backed off. After retrieval, perforating new zone and setting bridge plug on lower zone the well would pressure to 550 psi and leak-off was steady at 10 psi/minute to 200 psi. This would not pass MIT.

Solution: Rig-up and pump 300 PSI-SEALMAKER II®. Pumped 20 gal Vortex A, 10 gal Vortex B, and 10 gal SEALMAKER II®. The well was isolated to nitrogen and pressured to 575 psi. Well passed MIT @ 21 hours.

The 300 PSI method currently recorded has a 97.7% success rate more particularly 43 successful treatments and resulting MIT on 44 total attempts.

The present invention, described in detail in the foregoing preferred embodiments and demonstrated in its examples thereof, is subject to alterations and modifications by those skilled in the art. Such alterations and modifications inherent to the invention are encompassed within the scope of the invention.

We claim:

1. In the maintenance and sustentation of mechanical integrity to wellbore casings of the type having an annulus formed between a well casing and concentric tubing therein, a method of patching annular casing leaks comprising:

a) injecting into the annulus an aqueous first-stage solution of $CaCl_2$ in $H_2O$;

b) sequentially injecting an aqueous second-stage solution of $Na_2SiO_3$ to react with the first-stage solution and yield a highly permeable plugging $CaSiO_3$ and $2NaCl$ crystalline structure that possesses a high filtration rate, depositing a thick filter cake when pressed;

c) thereafter injecting a third stage of slurry lost circulation materials comprising bentonite/attapulgite/diatomaceous earth, the pH thereof being at least 11.0 to bridge and plug porosity and permeability of $CaSiO_3$ and $2NaCl$ crystalline structure;

d) sequentially injecting a fourth-stage of compressed nitrogen gas, regulated for flow, into the annulus behind said first and second-stage solutions and third-stage slurry, thereby imparting a filtration process therein; and e) continuing the filtration process while relying on differing filtration characteristics of said solutions and slurry to create a complete, impermeable seal behind the wellbore casing and wellbore.

2. The method of claim 1 wherein said first, second, third and fourth stage injecting is by centrifuge wherein the well is producing through a packer.

3. The method of claim 1 wherein said $CaSiO_3$ and $2NaCl$ crystalline structure possesses a high filtration rate which exceeds 20 cc water/1 minute, while forming a highly permeable plugging material.

4. The method of claim 3 wherein said third stage consisting of bentonite/attapulgite/diatomaceous earth and concentrations of lost circulation materials, together impart a specifically reduced filtration rate and solids content to emplace at annular casing leaks a bridge permeability and porosity matrix of a highly permeable plugging substance.

5. The method of claim 1 where said fourth-stage compressed nitrogen gas imparts filtration and applies continuous pressing forces on said first-stage solution and second-stage slurry to complete filtration, to final sealing of said casing leak, and to pressurize said wellbore for mechanical integrity testing.

6. The method of claim 1 as applied to a leak of such small size that it may be bridged with solids content of the solutions passing therethrough and providing bridging in the casing wall itself rather than outside the casing wall wherein an annular casing leak is patched at any one of said four stages to complete the seal, the hole being plugged premature of all steps of the entire method.

7. The method of claim 6 wherein said hole is plugged premature of the entire process, because the hole is bridged at an open-hole wellbore rock matrix, the solids content of the solution bridging that open-hole wellbore rock matrix porosity permeability, thereby eliminating leak-off on a mechanical integrity test.

8. The method of claim 1 wherein one employs a pump capable of pumping any of the said solutions, equipped with a safety bypass, so as not to exceed pressures between 200 psig and 500 psig, with maximum pump output approximately equal to required mechanical integrity pressure.

9. The method of claim 8 wherein the respective stages are injected into the annulus by high pressure centrifugal pump.

10. The method of claim 9 as applied to a well selectively having a wellbore packer, the well producing through a packer due to excess water from at least one casing leak.

* * * * *